(12) United States Patent
Nesheim

(10) Patent No.: US 6,270,387 B1
(45) Date of Patent: Aug. 7, 2001

(54) BUOYANT DEVICE

(75) Inventor: Arvid Nesheim, Vollen (NO)

(73) Assignee: ABB Off-Shore Technology AS, Nesbu (NO)

( * ) Notice: Subject to any disclaimer, the term of this patent is extended or adjusted under 35 U.S.C. 154(b) by 0 days.

(21) Appl. No.: 09/331,032

(22) PCT Filed: Dec. 15, 1997

(86) PCT No.: PCT/NO97/00341

§ 371 Date: Aug. 13, 1999

§ 102(e) Date: Aug. 13, 1999

(87) PCT Pub. No.: WO98/27373

PCT Pub. Date: Jun. 25, 1998

(30) Foreign Application Priority Data

Dec. 16, 1996 (NO) .................................................. 965417

(51) Int. Cl.[7] .................................................. B63B 22/00
(52) U.S. Cl. .......................... 441/133; 405/211; 405/212
(58) Field of Search .................. 441/133; 405/195.1, 405/211, 171, 212, 216; 114/243

(56) References Cited

U.S. PATENT DOCUMENTS

| | | | |
|---|---|---|---|
| 2,308,793 | * | 1/1943 | Upton .................................. 405/212 |
| 3,705,432 | * | 12/1972 | Watkins, Jr. ........................ 405/211 |
| 3,729,756 | * | 5/1973 | Cook et al. ......................... 405/211 |
| 3,992,735 | * | 11/1976 | McCarthy ............................ 405/211 |
| 4,176,986 | * | 12/1979 | Taft et al. ............................ 405/211 |
| 4,188,679 | * | 2/1980 | Hollaender et al. .................. 405/23 |
| 4,386,919 | * | 6/1983 | Kadono ................................ 441/133 |
| 4,422,801 | * | 12/1983 | Hale et al. .......................... 441/133 |
| 4,497,593 | * | 2/1985 | Kramer .............................. 405/212 |
| 4,506,622 | * | 3/1985 | Linehan et al. ..................... 441/133 |
| 4,596,531 | * | 6/1986 | Schwann et al. ................... 441/133 |
| 5,330,378 | * | 7/1994 | Park .................................. 441/133 |
| 5,711,639 | * | 1/1998 | Tessier et al. ...................... 405/171 |
| 6,048,136 | * | 4/2000 | Denison et al. .................... 405/211 |

* cited by examiner

Primary Examiner—S. Joseph Morano
Assistant Examiner—Lars A. Olson
(74) Attorney, Agent, or Firm—Cohen, Pontani, Lieberman & Pavane

(57) ABSTRACT

A buoyancy device to be clamped around least one longitudinal element. The buoyancy device comprises an assembled clamping device which is to be fastened around the element, and at least one buoyancy member connected to the clamping device. The buoyancy member is divided longitudinally in at least two sections and is arranged around the element together with the clamping device. The buoyancy member is divided in at least two separate or jointly pivoted buoyancy segments which may be folded around the elements(s) and loosely enclose a part of this (these). The clamping device is divided in at least two separate, or hinged together, clamping segments, adapted to be folded around the element(s), preferably in a firm and prestressed manner. The buoyancy segments are mechanically interconnected by at least one of the clamping segments by means of radically extending, complementary designed parts of the buoyancy segment and the clamping device respectively; so that the clamping devices and the buoyancy devices are interconnected to an integrated buoyancy device, by means of at least one peripheral tension element which is slideably fastened at fastening points, farthest out on the radially extending parts of the clamping segments, without stressing the buoyancy members.

10 Claims, 2 Drawing Sheets

BUOYANT DEVICE

BACKGROUND OF THE INVENTION

The present invention relates to a buoyancy device and in particular to a buoyancy device adapted to be clamped around at least one longitudinal element, heavier than water, and designed to be mounted below water.

DESCRIPTION OF THE RELATED ART

Many different examples of buoyancy devices that are adapted to be clamped around oil or gas conduits leading to or from the sea bed, and to be mounted to electrical cables or similar elements previously known.

As examples of previously known technique in this field the following publications may be referred to.

In U.S. Pat. No. 3,729,756 a divided, shell-shaped flotation collar adapted to be clamped around a riser tube with associated additional tubes is disclosed. The flotation collar as a whole comprises an outer flotation member comprising a semicircular shell of fibre glass, and a central clamping means which may be separated and fastened around the longitudinal element by means of bolts, which element is to be affected by the desired buoyancy. The outer flotation members are fastened to V-straps which again are welded to the outer side of the clamping halves.

U.S. Pat. No. 4,477,207 also refers to a buoyancy assembly for mounting on a riser or a similar type including certain additional pipelines. Also, in this citation the buoyancy assembly is dividable in sections manufactured by fastening of these sections is a clamping device comprising a centrally arranged band with protruding flanges, which band should first of all be fastened around the riser. An outer belt or strap is arranged along the perimeter, tightly around the sections, retaining the same.

U.S. Pat. No. 4,176,986 refers to a plurality of buoyancy cans provided with valves. These cans are filled up by compressed gas and thereby rapidly transfer buoyancy to a riser around which the cans are clamped. These cans have the shape of hollow containers divided in two parts.

U.S. Pat. No. 3,957,112 refers to a buoyancy means in which a lot of stiff-walled tubes having a small diameter are arranged around the outer wall of a marine riser by special fastening means.

U.S. Pat. No. 4,422,801 refers to a buoyancy system for large underwater risers, where the system comprises a plurality of hollow canisters arranged after each other in a row. Air may be pumped into the canisters which are interconnected along the riser so that air filled into the lower canister successively may dill the canisters arranged higher up. This system comprising a series of interconnected canisters, is also divided in more sections around the riser.

U.S. Pat. No. 3,705,432 refers to a flotation assembly including semi-annular flotation collars, similar to those mentioned in U.S. Pat. No. 3,729,756. However, the clamping device is rather complicated and comprises a lot of minor, individual elements.

German DAS 15 06 724 refers to a pipe-shaped buoyancy device to be clamped around a riser. The buoyancy device is divided in two substantially identical halves, and is provided with outer clamping straps 14. The feature protected in this publication is the design of the interface between the two halves in a sort of tongue and groove joint.

All the earlier known buoyancy members have to be exactly associated to a riser having a specific diameter. To have buoyancy members adapted for use together with different risers available, a large quantity of such buoyancy members designed for risers of different dimensions one's must be at disposal.

A accordingly, there is a need for buoyancy members which may be used for risers within a certain range of different diameters.

The earlier known buoyancy means are in addition assembled from many different and individual parts. When such prior art buoyancy devices are to be mounted to a riser, great care must be shown that none of the separate parts will go lost. Accordingly the mounting of the prior art buoyancy devices is difficult and time consuming, especially when the operation takes place below water.

Therefore there is a need for buoyancy devices which, even when assembled form many parts, have such a design that each single buoyancy device before mounting consists of one single continuous and integrated unit which is not easily or unintentionally separated in different parts.

A further disadvantage of previously known buoyancy devices is that they relatively easily may be moved along the riser, especially if the diameter of the same varies longitudinally. Accordingly it is also an object of the present invention to provide buoyancy devices which, when clamped around a riser or a similar longitudinal element, exert a considerable pressure under prestress conditions towards the outer wall of the riser, preferably in such a manner that this force may be adjusted during the mountion operation so that the clamping is secure even if the diameter of the riser varies a certain amount along its length.

Finally it should be mentioned that there is a need for cost-effective buoyancy devices which both are inexpensive during manufacturing ad they comprise a few parts which are simple to produce and also as they rapidly may be mounted to the riser at a desired location even if the diameter of the riser varies and ever when the complete riser or parts of the same is (are) situated below water. It should be pointed out that the mounting expenditures may be very high due to required mounting equipment, use of divers and possibly also use of rigs on the mounting site. All reductions in the mounting time for such buoyancy devices accordingly are of great importance both economically and of security reasons.

SUMMARY OF THE INVENTION

One object of the present invention, is to provide buoyancy members which may be used for risers within a certain range of different diameters.

A further object of the present invention is to provide buoyancy devices which, even when assembled from many parts, have such a design that each single buoyancy device before mounting consists of one single continuous and integrated unit which not easily and unintentionally may be separated in different parts.

Finally it should be mentioned that one object of the present invention is to provide cost-effective buoyancy devices which both are inexpensive during manufacturing as they comprise a few parts which are simple to produce and also as they rapidly may be mounted to the riser at a desired location even if the diameter of the riser varies and even when the complete riser or parts of the same is (are) situated below water. A buoyancy device adapted to be clamped around at least one longitudinal element, comprising at least one clamping portion for holding the at least one longitudinal element in said buoyancy device, said at least one clamping portion comprising at least one radial extension, said at least one radial extension comprising an inner clamping end and an outer fastening end at least one buoyancy portion for holding the at least one clamping portion; and at least one peripheral tensional element for slidably fastening onto the outer fastening end of the at least one radial extension, where tension in said at least one peripheral tensional element provides force for clamping the inner clamping end of the at least one radial extension onto the at least one longitudinal element.

All objects and advantages mentioned above are met by using buoyancy devices as defined in the claims below.

BRIEF DESCRIPTION OF THE DRAWINGS

A clearer understanding of the present invention will be appreciated from the more detailed description of the presently preferred embodiments of the present invention, below which should read in conjunction with the accompanying drawings, in which.

DETAILED DESCRIPTION OF THE PREFERRED EMBODIMENTS

It should in particular be pointed out that the embodiments shown in the figures and described in this detailed description are only examples which may be varied within wide limits without leaving the scope of the present invention, e.g. as recesses for further lines or elements which may run along the riser, may be included.

In addition it should be mentioned that the same reference numbers are used for corresponding elements and components on all the figures when found convenient, that some constructional details which not necessarily have to be included in all embodiments of the invention are omitted to avoid crowded drawings, and that the dimensions and mutual relations within one drawing and on different drawings not necessarily are shown in same scale. In other words the drawings shown are first of all meant to be principle drawings to explain the principles of the present invention.

Figure 1:
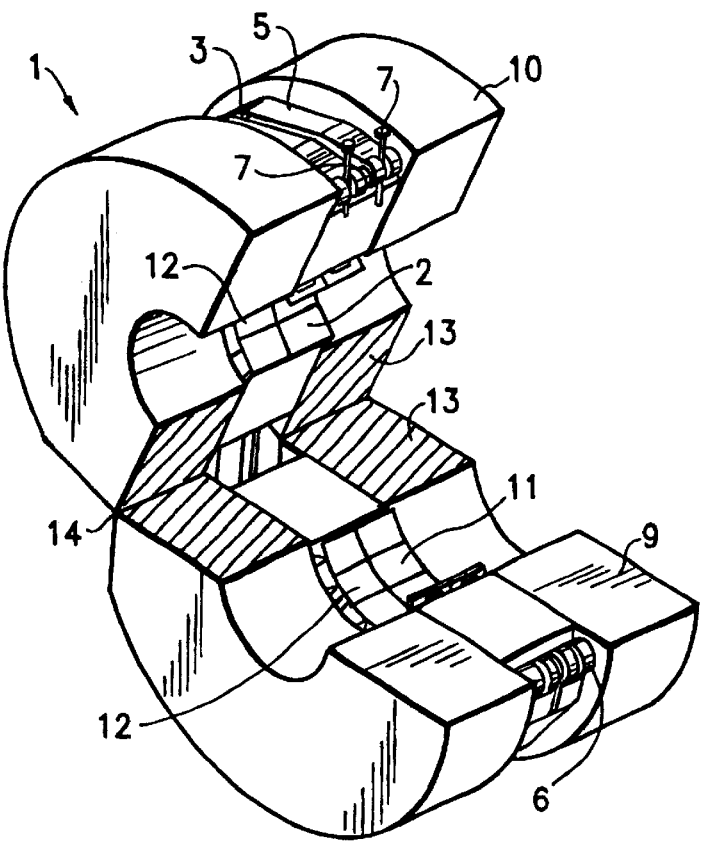
FIG. 1 shows a buoyancy device in open, not mounted condition.

On FIG. 1 one single buoyancy device is shown, adapted to be clamped around a longitudinal, possibly cylindrical element, which has not been shown on this figure. Accordingly the buoyancy device 1 is shown alone and in open condition as it is before being clamped to the riser or after being removed from the riser. The buoyancy members themselves are shown as two shell-shaped, substantially semi-cylindric buoyancy members 9,10 which preferable are fastened to each other along a linear area shown at 14. This area 14 accordingly will act as a hinge, and this hinge may be manufactured in any known manner. The hinge may, e.g. being produced by gluing a foldable strip, e.g. of plastics, to the adjacent and opposite surfaces of the buoyancy devices 9 and 10, i.e. the hatched surfaces 14 in FIG. 1.

This design gives a construction which allows the two semicylindrical buoyancy members 9,10 to be closed around a longitudinal, pipe-shaped element when arranged within the recess in one of the buoyancy members.

The very clamping of the buoyancy device 1 to a riser or to a similar longitudinal and cylindrical member, does not take place by means of a direct touch or contact between the buoyancy members 9,10 and the outer wall of the riser 8. The clamping itself instead is obtained by means of a central clamping device 2 which preferably is divided in multiple separate clamping sections, e.g. 11,12 in FIG. 1. Even if the design of the central clamping device is not quite clearly shown in FIG. 1, it may already be stated that each section of the clamping element, such as 11 on the figure, comprises a central clamp which may exert the contact between the outer surface of the riser, a radially directed pole 4 (shown on FIG. 3) which passes through a corresponding radial opening made in the buoyancy member at a suitable place therein, and a peripheral arranged fastening device 3 positioned at the outer surface of the buoyancy member 9,10. All these details are shown more clearly on FIG. 3, and will be explained when that figure is discussed. However, it should be mentioned that the clamping and fixing of such a buoyancy device 1 are obtained by means of one or more tensioning straps 5 running along the perimeter of the complete buoyancy device 1 when closed.

Figure 2:
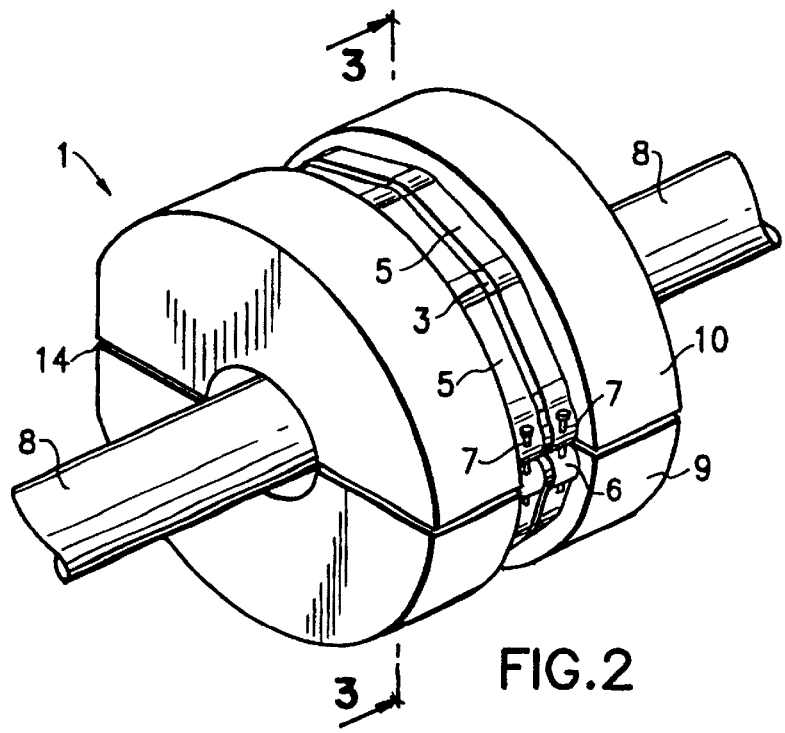
FIG. 2 shows a buoyancy device according to FIG. 1 mounted around a longitudinal element which may be below or above water.

In FIG. 1 a fastening device for the tensioning strap 5 is shown as bolts or other fastening elements 7, and on FIG. 2 it is assumed how such bolts or fastening elements 7 may be used to fasten the buoyancy device 1 around a longitudinal cylinder.

It should be noted that the division of the clamping device 2 into sections 11,12, as well as the radial connections 4 between the centrally arranged clamps and the strap 5 at the periphery, will give a high degree of flexibility when the device is to be fastened around risers or other cylindrical elements having different or varying shapes or diameters. The reason is that the central opening or the central openings in the shell-shaped buoyancy members 9,10 has a somewhat greater diameter than the corresponding diameter of the central clamping device itself, when the clamp is forced to closed position. If the tensioning strap 5 or the radial elements between the tensioning strap, and the central clamps 11, not shown so far, are made of an elastic material, a powerful pre-tensional force may be obtained when the fastening bolts or the fastening device 7 is tightened. It should also be mentioned that the fastening bolts preferably are designed in a per se known manner to prevent the bolts to come free from the corresponding mounting openings even when loosened from the lower portion 9 so that the buoyancy device 1 may be opened.

Figure 3:
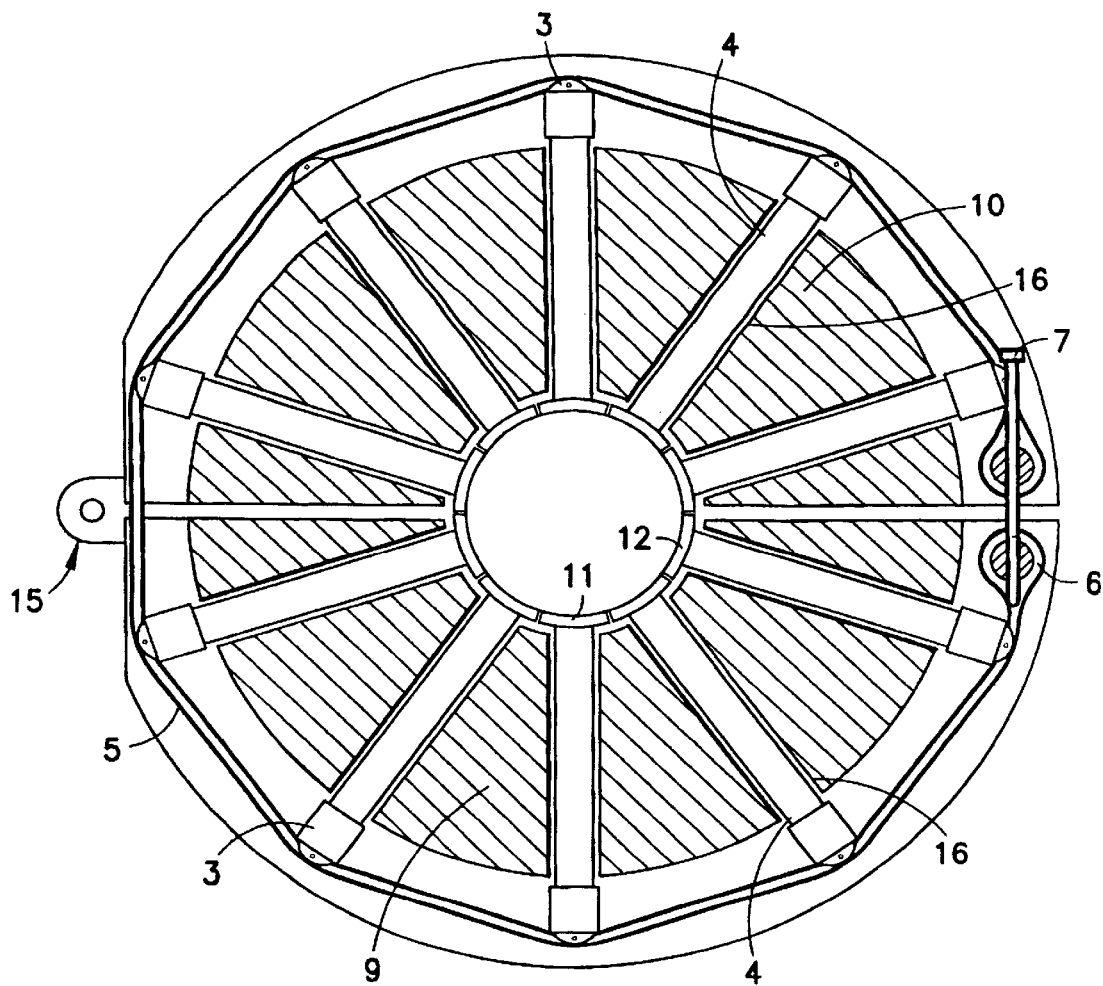
FIG. 3 shows a cross section through a buoyancy device according to the present invention.

On FIG. 3 it is shown how each of the central clamps 2, being divided in sections 11,12, is connected to a peripheral arranged fastening device 3. In turn, each fastening device 3 is slidably connected with the tensioning strap 5 so that loose parts are avoided. The tensioning strap 5 may, e.g. slide through openings made in the top of each fastening device 3, as a belt through belt carriers. Each clamping section such as 11, is fixedly or pivotally connected to the corresponding radially running pole 4, which at its opposite end is connected to the fastening device 3. The pole 4 is pushed into a boring 16 in the buoyancy member 9, preferably with a certain play, and at the outer end of the buoyancy member the fastening device 3 is connected to the pole 4. As the fastening devices 3 and the clamping sections 11,12 have such a form and size that they cannot be pulled through the boring 16, the complete clamp system will be integrated in one single unit when the components are fastened together. This also relates to the tensioning strap 5 which is slidably fastened to the fastening devices 3 around the complete device, however, in such a manner that it cannot be unintentionally separated.

As assumed on FIG. 3 it should be a certain play between the parts included in the clamping device and the parts which represent the buoyancy members; so that these components may be relatively moved and accordingly may be adapted to different diameter dimensions of the element 8.

Finally it may be mentioned that the fastening device and the tightening device, e.g. may comprise two brackets 6 which may have many different designs using through threaded openings and at least one fastening bolt 7. The bolts 7 are designed in such a manner that they cannot be completely removed from their upper fastening brackets 6, e.g. as they are provided with a narrow neck which may rotate in a sleeve.

On the opposite side of the buoyancy member the hinge is arranged, and on FIG. 3 the hinge is shown as an external hinge 15 which may be used together with or, in addition to the earlier mentioned band hinge shown at 14.

When the buoyancy device 1 is clamped around one or more longitudinal elements 8, the buoyancy member is folded around the element(s) and the tension strap 5 is tightened, e.g. by tightening the bolts 7 with a moment wrench. Then the shoes 11,12 divided into sections are pressed towards the element 8 while the buoyancy members 9,10 are not correspondingly strained.

To give a further explanation of the invention the following details may be mentioned:

The buoyancy device according to the present invention is designed in such a manner that the clamping device will be very flexible as an expansion/contraction of the riser will give only a small change in the pre-tensional force acting from the clamping device towards the pipe. This is obtained as the tension strap 5 is positioned around the perimeter of the buoyancy member, thus implementing a rather long tensioning element which accordingly obtains relatively large flexibility.

The tensioning strap 5 at the same time transmits a certain pre-tensional force towards the centrally located clamps 2,11,12 through the radially running poles 4 without straining the buoyancy members in a degree worth mentioning. At the same time the clamping device 2,3,4,5,6,7 is designed in such a manner that it may be adapted to varying diameters of the riser, just because the radial poles 4 may be shifted in radial direction without any corresponding damage to the buoyancy member.

When practical use of the buoyancy member is considered, it is also important that the clamping device 2-7 is designed to avoid loose parts which may be lost during storing, transportation or mounting.

The buoyancy member according to the present invention may be modified in many ways within the scope of the claims below. Thus, the material may be selected from many different metals and artificial products with high corrosion resistance. The buoyancy members may advantageously be manufactured from artificial material filled with pores, but all the same pressure resistant; possibly having a skin made of GRP (glass reinforced plastics). All the same it may be contemplated that the buoyancy members may consist of hollow metallic containers. The clamping sections 11,12 and the fastening devices 3 may preferably be of metallic, and this also counts for the poles 4 which however, also may be made of an artificial material or from compressible poles of any material when only having sufficient strength and resistance against corrosion. The tensional strap 5 preferably may be manufactured from aramid reinforced fibrous material.

In a similar manner the number of tensional straps around each element may vary, the length and the diameter of each buoyancy member may vary, and each buoyancy member may be divided in more than two semi-cylindric elements as shown. For example each buoyancy member may consist of a series of mutually rotatable elements which may be folded out to form a multi-sectioned structure. Normally this will represent a more expensive design, and accordingly the design shown on the figures will be preferred, including only one hinge, 14/5 in each element. The number of poles 4 may be selected within wide limits, and these poles may be positioned at one or more separated levels or rings. Further it is not required that all the poles are going quite through the buoyancy members 9,10, i.e. to the external surface of these.

The tensional strap 5 may be enclosed in recesses in the buoyancy members, as assumed in FIG. 1 and FIG. 2, but may also be arranged on the outer surface without any such recesses. The fastening devices 3 and the clamping device 6,7 may be designed in different manners within the scope of the present invention. The clamping device may, e.g. be shaped rather as a buckle of any type, preferably with tightening possibilities, known from other technical areas.

The longitudinal element 8 does not have to be circular, and the element 8 may comprise a plurality of parallel elements. In this case the central recesses in the buoyancy members will not have the shape of semi-cylinders, but will have a shape adapted to the design of the elements in question.

The assembly may take place before, during or after the laying out of the element(s) 8. In the last case, this may take place possibly by means of a diver or an ROV (remote-operated vehicle).

The tension straps 5 may be bands of aramid, straps of fibre or metal. The locking elements may consist of metal or GRP, which also may be used in stays, brackets and fastening devices.

What is claimed is:

1. A buoyancy device adapted to be clamped around at least one longitudinal element, comprising:

at least one clamping portion for holding the at least one longitudinal element in said buoyancy device, said at least one clamping portion comprising at least one radial extension, said at least one radial extension comprising an inner clamping end and an outer fastening end;

at least one buoyancy portion for holding the at least one clamping portion; and at least one peripheral tensional element for slidably fastening onto the outer fastening end of the at least one radial extension, where tension in said at least one peripheral tensional element provides force for clamping the inner clamping end of the at least one radial extension onto the at least one longitudinal element.

2. The buoyancy device as claimed in claim 1, wherein the at least one clamping portion and the at least one buoyancy portion are divided longitudinally into at least one clamping segment and at least one buoyancy segment, respectively, wherein each at least one clamping segment has an associated at least one buoyancy segment, and wherein each at least one clamping segment and associated at least one buoyancy segment have complementary designed parts so that they may be interconnected.

3. The buoyancy device as claimed in claim 2, wherein the complementary designed parts of the at least one clamping segment comprises at least one of the at least one radial extension.

4. The buoyancy device as claimed in claim 2, wherein each of the at least one buoyancy segment is pivotally hinged to at least one adjacent buoyancy segment by means of hinges having axes substantially parallel to the axis of the longitudinal element.

5. The buoyancy device as claimed in claim 2, wherein each of the at least one clamping segment is inter-hinged to at least one adjacent clamping segment by means of hinges having axes substantially parallel to the axis of the element.

6. The buoyancy device as claimed in claim 2, wherein the complementary designed parts of the at least one buoyancy segment comprise at least one radially extending opening or boring.

7. The buoyancy device as claimed in claim 2, wherein more than one mechanical connection is arranged between at least one of the at least one buoyancy segment and an associated clamping segment of the at least one of the at least one buoyancy segment along a total length of the buoyancy device.

8. The buoyancy device as claimed in claim 1, wherein the at least one radial extension is divided longitudinally into two parallel stays which in turn are pivotally jointed at their peripheral ends.

9. The buoyancy device as claimed in claim 1, wherein the at least one clamping portion is manufactured from fiber reinforced plastics, the peripheral tensional element is made of one of an aramid type, a fiber strap and a metal band, while the interconnecting elements consist of one of metal and GRP.

10. The buoyancy device as claimed in claim 1, wherein the fastening ends of a plurality of the at least one radial extension are movably, but not separably interconnected by means of the at least one peripheral tensional element, said at least one peripheral tensional element comprising at least one flexible, but scarcely stretchable tension strap, and the fastening ends are provided with firmly mounted fastening elements.

* * * * *